United States Patent
Tobino et al.

(10) Patent No.: US 6,533,011 B2
(45) Date of Patent: Mar. 18, 2003

(54) PNEUMATIC TIRE WITH BELT LAYER OVERLAPPING FOLDED PORTION OF CARCASS

(75) Inventors: Yoshiyuki Tobino, Izumiohtsu (JP); Takehiko Murata, Izumiohtsu (JP)

(73) Assignee: The Ohtsu Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/858,539

(22) Filed: May 17, 2001

(65) Prior Publication Data
US 2002/0000279 A1 Jan. 3, 2002

(30) Foreign Application Priority Data
May 17, 2000 (JP) ......................... 2000-144488

(51) Int. Cl.$^7$ ..................... B60C 3/00; B60C 15/00; B60C 15/06; B60C 17/00
(52) U.S. Cl. ................... 152/454; 152/517; 152/541; 152/554
(58) Field of Search ................. 152/517, 554, 152/454, 541

(56) References Cited

U.S. PATENT DOCUMENTS 5,427,166 A 6/1995 Willard, Jr.
5,820,711 A 10/1998 Sakamoto et al.
2002/0003017 A1 * 1/2002 Baumann et al. ........... 152/517

FOREIGN PATENT DOCUMENTS

| EP | 0 842 795 A2 | 5/1998 |
| JP | 10-244817 | 9/1998 |
| JP | 2000-168319 | 6/2000 |
| WO | WO 99/48710 | 9/1999 |

* cited by examiner

Primary Examiner—Adrienne C. Johnstone
(74) Attorney, Agent, or Firm—Birch, Stewart, Kolasch and Birch, LLP

(57) ABSTRACT

A pneumatic tire, includes at least one carcass ply folded turned up around a bead cord, a belt layer arranged on an outer side of a crown portion of the carcass ply to have an overlapping portion with the folded portion of the carcass, a first reinforcing rubber layer arranged between body portion of the carcass ply and the folded portion of the carcass ply, and a second reinforcing rubber layer arranged inside the body portion of the carcass ply, wherein overlapping width $W_2$ from an upper end position RF of the second reinforcing rubber layer to an end BE of the belt layer is 7% to 33% of the width BW of the belt layer; and cross sectional widths G1W, G2W, and G3W satisfy the following relations:

$G3W/G1W = 0.85$ to $0.95$, and $G2W/G1W = 1.0$ to $1.05$.

5 Claims, 5 Drawing Sheets

PNEUMATIC TIRE WITH BELT LAYER OVERLAPPING FOLDED PORTION OF CARCASS

BACKGROUND OF THE INVENTION

1. Field of the Invention

The present invention relates to a pneumatic tire and, more specifically, to a run-flat tire that enables safe drive over a long distance even with a decreased inner pressure at the time of puncture.

2. Description of the Background Art

Generally, at the time of a tire puncture, a side-wall portion 31 having low rigidity of the tire is folded and protruded in the widthwise direction of the tire as shown in FIG. 6, and a tread portion 32 moves inward in the radial direction of the tire, so that the tire becomes flat. When running continues, a tire bead portion 33 falls into a rim well 34, possibly causing a hazardous state in which the tire drops off from the rim, disabling steering, or an inner upper end 33a of the bead portion is repeatedly subjected to severe friction with the tire inner region 32a of the tread portion, damaging the tire.

Conventionally, as a structure of a so-called run-flat tire enabling safe drive even at the time of tire puncture, the following structures have been proposed: a structure in which a crescent shape reinforcing rubber layer is arranged in contact with an inner side of a tire carcass over the bead portion to a shoulder portion, with its thickness gradually reduced toward opposing ends, or a structure in which a reinforcing rubber is arranged from the bead portion to an end of the thread portion between the carcass body and a folded portion thereof (Japanese Patent Laying-Open No. 10-244817); and a structure in which two-layered reinforcing rubber is arranged between a plurality of carcass plies or reinforcing plies (U.S. Pat. No. 5,427,166).

The above described prior art contemplates to reduce tire deformation at the time of puncture to avoid the hazardous state described above, by increasing rigidity of the side-wall portion by the reinforcing rubber. However, the reinforcing rubber layer arranged on an inner peripheral side of the carcass body portion as described above increases local strain at the side-wall portion at the time of tire puncture, and therefore damage to the side-wall portion of the tire cannot be alleviated. In order to further enhance the effect of reinforcement, the thickness of the reinforcing rubber layer must naturally be increased. This, however, increases the weight of the tire, and decreases fuel efficiency of the vehicle.

SUMMARY OF THE INVENTION

An object of the present invention is to provide a pneumatic tire, and particularly a run-flat tire, having tire weight effectively reduced and enabling safe running over a long distance even at a time of tire puncture.

The present invention provides a pneumatic tire, including at least one carcass ply having a steel cord arranged substantially in a radial direction of the tire, folded turned up around a bead core, a belt layer arranged on an outer side of a crown portion of the carcass ply to have an overlapping portion with the folded portion of the carcass, a first reinforcing rubber layer arranged between body portion of the carcass ply and the folded portion of the carcass ply, and a second reinforcing rubber layer arranged inside the body portion of the carcass ply, over a region corresponding to a tire shoulder portion to a bead portion, with its thickness gradually reduced from a central portion to opposing end portions, wherein overlapping width $W_2$ from an upper end position RF of the second reinforcing rubber layer to an end BE of the belt layer is 7% to 33% of the width BW of the belt layer, and cross sectional widths G1W, G2W, and G3W representing minimum widths between an inner surface of the tire and respective side-wall outer surface positions G1, G2 and G3 at portions of ¼GL to ¾GL corresponding to cross sectional height GL from an upper end of a bead wire to a tire outer peripheral end divided equally by 4 satisfy the following relations:

$$G3W/G1W = 0.85 \text{ to } 0.95, \text{ and}$$

$$G2W/G1W = 1.0 \text{ to } 1.05.$$

In the present invention, preferably, respective cross sectional widths G1W, G2W and G3W at respective side-wall outer surface positions G1, G2, and G3 corresponding to ¼GL to ¾GL, and widths G1a, G2a, and G3a of the second reinforcing rubber layer at respective positions satisfy the following relations:

$$G1a/G1W = 0.30 \text{ to } 0.55$$

$$G2a/G2W = 0.38 \text{ to } 0.48, \text{ and}$$

$$G3a/G3W = 0.20 \text{ to } 0.30.$$

Further, it is desired that the first reinforcing rubber layer consists of two layers including a hard rubber layer extending in a direction from an upper side of the bead core to the side-wall portion, having JISA hardness of 80 to 95, and a soft rubber layer extending from an upper side of the hard rubber layer to a vicinity of an end portion of the belt layer, having JISA hardness of 65 to 80.

Further, overlapping width $W_1$ of the upper end RE of the first reinforcing rubber layer and the end BE of the belt layer is in the range of 3% to 20% of the width BW of the belt width.

According to another aspect, the present invention provides a pneumatic tire, including at least one carcass ply having a steel cord arranged substantially in a radial direction of the tire, folded turned up around a bead core, a belt layer arranged on an outer side of a crown portion of the carcass ply to have an overlapping portion with the folded portion of the carcass, a first reinforcing rubber layer arranged between body portion of the carcass ply and the folded portion of the carcass ply, and a second reinforcing rubber layer arranged inside the body portion of the carcass ply, over a region corresponding to a tire shoulder portion to a bead portion, with its thickness gradually reduced from a central portion to opposing end portions, wherein overlapping width $W_1$ of an upper end position RE of the first reinforcing rubber layer and an end BE of the belt layer is in the range of 3% to 20% of the width BW of the belt layer, an overlapping width $W_2$ of an upper end position RF of the second reinforcing rubber layer and the end BE of the belt layer is 7% to 33% of the width BW of the belt layer, and thickness RW of the second reinforcing rubber layer on a line TL connecting the end BE of the belt layer and a tread end TE is 5% to 25% of the total thickness SW of the tire. Preferably, the first reinforcing rubber layer consists of two layers including a hard rubber layer extending in a direction from an upper side of the bead core to the side-wall portion, having JISA hardness of 80 to 95, and a soft rubber layer extending from an upper side of the hard rubber layer to a vicinity of an end portion of the belt layer, having JISA hardness of 65 to 80. Further, preferably, JISA hardness of the second reinforcing rubber layer is in the range of 65 to 80.

Further, in the pneumatic tire of the present invention, the width Ga of the second reinforcing rubber layer, the width Gb of the soft rubber layer and the width Gc of the hard rubber layer of the first reinforcing rubber layer and the width Gd of the side-wall on the lines of minimum cross sectional widths G11W, G12W, G13W and G14W representing minimum widths from respective inner liner positions G11, G12, G13 and G14 to a tire outer contour line at positions $\frac{1}{6}$GL to $\frac{4}{6}$GL corresponding to the cross sectional height GL from a lower end of the bead wire to a tire outer peripheral end divided equally by 6 satisfy the following relations:

At G11W, $G11a \leqq G11d < G11c$,

At G12W, $G12b < G12a \leqq G12c < G2d$,

At G13W, $G13a \approx G13b \approx G13d$, and

At G14W, $G14a \approx G14b < G14d$.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described with reference to the figures.

Figure 1:
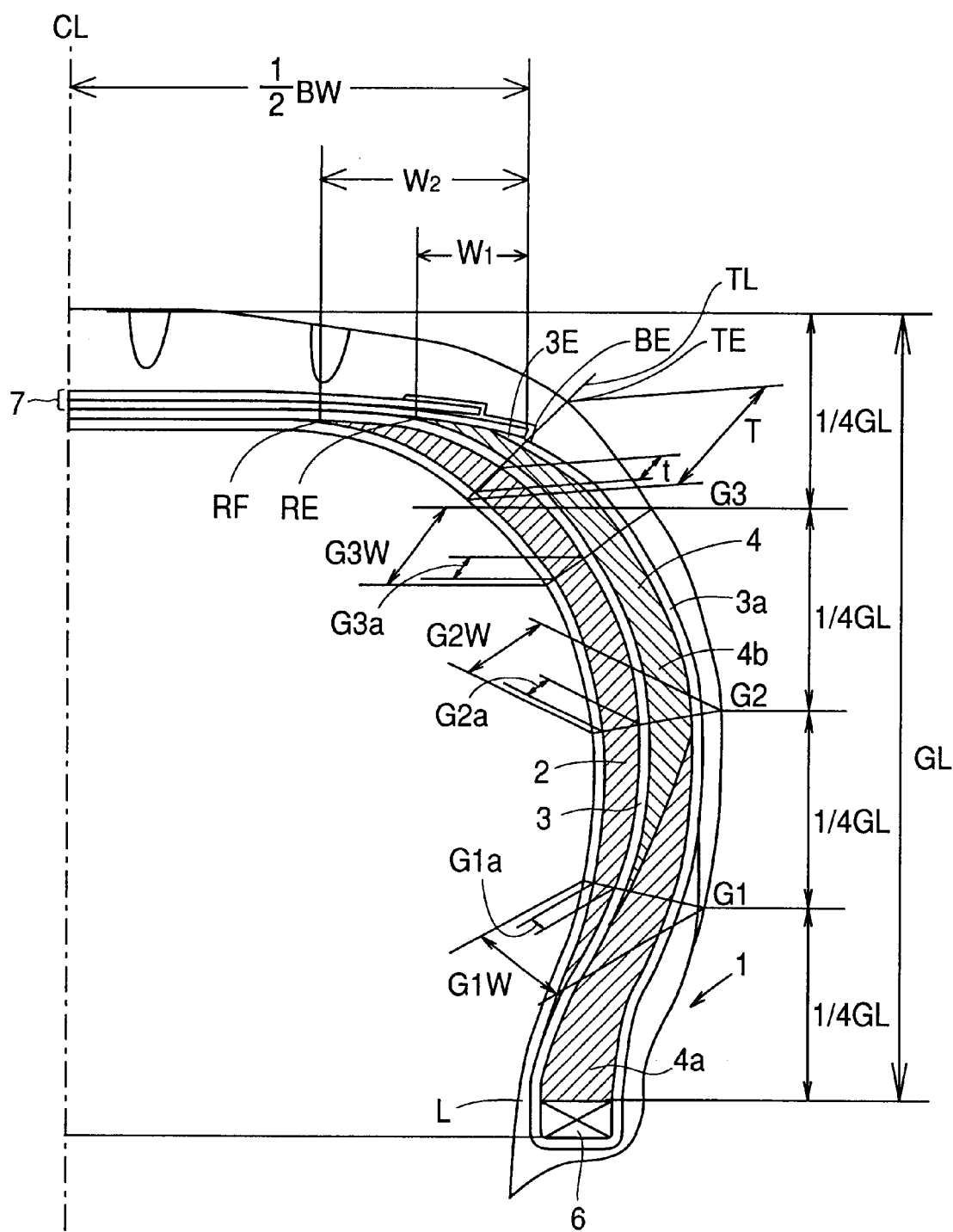
FIG. 1 shows a right half of a tire cross section in accordance with one embodiment of the present invention.

FIG. 1 shows the right half of a cross section of a pneumatic tire representing an embodiment of the present invention.

Here, the pneumatic tire 1 in accordance with the present invention has at least one carcass ply 3 with cords arranged substantially in the radial direction of the tire, folded turned up around a bead core 6 from the inside to the outside. A folded end 3E is fixed below a belt layer 7 arranged outside a crown portion of the carcass ply, to be partially overlapped with an end portion of the belt layer. Carcass ply 3 has its folded end 3E pulled to the direction of the bead portion as it is repeatedly subjected to deformation as the tire runs, and the rubber deforms near the end portion BE of the belt layer. Therefore, stress concentration tends to generate here. Therefore, by fixing the folded end 3E at a lower side of the belt layer, the effect of reducing stress concentration and improving rigidity of the side-wall portion can be attained. Here, the width of overlapping between the folded portion 3a of the carcass ply and the belt layer 7 should preferably be 5 to 20% of the width BW of the belt layer.

A steel cord of (1×n) structure such as 1×2, 1×3, 1×4 and 1×5, or (2×n) structure may be used as a carcass cord. The diameter of the steel filament constituting the cord is preferably in the range of 0.10 to 0.30 mm and more preferably, 0.15 to 0.27 mm. A steel cord having tensile strength per one cord of 100N to 480N, and more particularly 150N to 450N is preferably used. Use of such a steel cord improves lateral rigidity of the side-wall portion of the tire, further enhancing steering stability and durability in the run-flat situation.

Further, carcass strength (cord number in the width of 5 cm×cord strength) for the width of 5 cm of the carcass ply is in the range of 3500 N to 15800 N and more preferably, 4500 N to 11000 N. When the carcass strength is smaller than 3500 N, rigidity would be insufficient, degrading durability in the run-flat situation. When the strength exceeds 15800 N, heat tends to build up while the tire is running, degrading durability.

The steel cord is arranged in the range of 80° to 90° and more particularly 86° to 90° with respect to the peripheral direction of the tire.

Next, in the present invention, a first reinforcing rubber layer 4 is arranged between carcass ply body 3 and the folded portion 3a thereof, extending from an upper end of bead core 6 to the vicinity of an end portion of the belt layer. Here, the overlapping width $W_1$ between the upper end position RE of the first reinforcing rubber layer and the belt layer should preferably in the range of 3% to 20% of the width BW of the belt layer. When the overlapping width $W_1$ is smaller than 3%, the upper end position RE of the first reinforcing rubber layer would be positioned near or below the end BE of the belt layer, generating an abrupt change in rigidity in this region, which tends to produce stress concentration.

By contrast, when the width exceeds 20%, the volume of the rubber layer not contributing to the run-flat property increases, which is disadvantageous in reducing the weight of the tire. Preferably, the first reinforcing rubber layer 4 consists of two layers, including a hard rubber layer 4a extending from an upper side of the bead core to the direction of the side-wall portion with its thickness gradually reduced and having JISA hardness of 80 to 95 and more preferably 85 to 95, and a soft rubber layer 4b extending from an upper side of the hard rubber layer 4a to the vicinity of the end portion of the belt layer and having JISA hardness of 65 to 80 and preferably 65 to 70.

Hard rubber layer 4a reinforces the bead portion and enhances lateral rigidity of the tire at the time of tire puncture, while soft rubber layer 4b reinforces the tire side-wall portion, relaxes stress concentration near opposing ends of the belt layer at the shoulder portion and alleviates damages. When the first reinforcing rubber layer 4 is to be formed of one layer, a material having JISA hardness of 65 to 90, and more preferably 65 to 85, is used. As the first reinforcing rubber layer 4 is surrounded by the carcass ply with the upper end of the folded portion of the carcass ply fixed at the lower side of the end portion of the belt layer, the effect of reinforcement can further be enhanced by the volume effect.

Next, in the pneumatic tire in accordance with the present invention, a second reinforcing rubber layer 2 is arranged on the inner side of carcass ply body 3 over a region from a portion corresponding to the tire shoulder portion to the bead portion. The second reinforcing rubber layer 2 is of a rubber composition having small oil content and superior heat resistance, and a relatively soft rubber having JISA hardness of 65 to 80 is used. At the time of tire puncture, the side-wall portion is folded protruding outward, and the second reinforcing rubber layer 2 inside the tire is subjected to severe flexion deformation. Therefore, the second reinforcing rubber layer is formed by using rubber with low heat build up property, for example, rubber having the resilience of at least 50%, so that heat build-up associated with the flexion deformation can be suppressed. As to the cross sectional shape of the second reinforcing rubber layer 2, it has substantially the maximum width in the side-wall region, the thickness is gradually reduced toward opposing ends, and the upper end portion RF extends inward, over the end BE of the belt layer. The overlapping width $W_2$ with the belt layer is in the range of 7 to 33% of the width BW of the belt layer. When the overlapping width is smaller than 7%, a bead portion and a shoulder portion of the second reinforcing rubber layer would not be in contact with each other, and hence the effect of reducing friction heat cannot be attained. When the width exceeds 33%, unnecessary rubber that does not have the function of reducing heat build-up would be arranged, undesirably increasing the weight of the tire.

When the each space between the upper end RE of the first reinforcing layer and the upper end RF of the second reinforcing layer, between the upper end RE of the first reinforcing layer and the folded end 3E of the carcass is set to be in the range of 2% to 20% of the width BW of the belt layer, origins of stress concentration can be dispersed, and hence durability can further be enhanced.

At the shoulder portion of the pneumatic tire shown in FIG. 1, the thickness t of the second reinforcing rubber layer on a line TL connecting the end BE of the belt layer and a tread end TE should desirably be within the range of 18% to 50% of the entire tire thickness T.

Here, the tread end TE is defined as an intersecting point of an extension of curvature arc of the tread portion and an extension of curvature arc of the shoulder portion.

Figure 6:
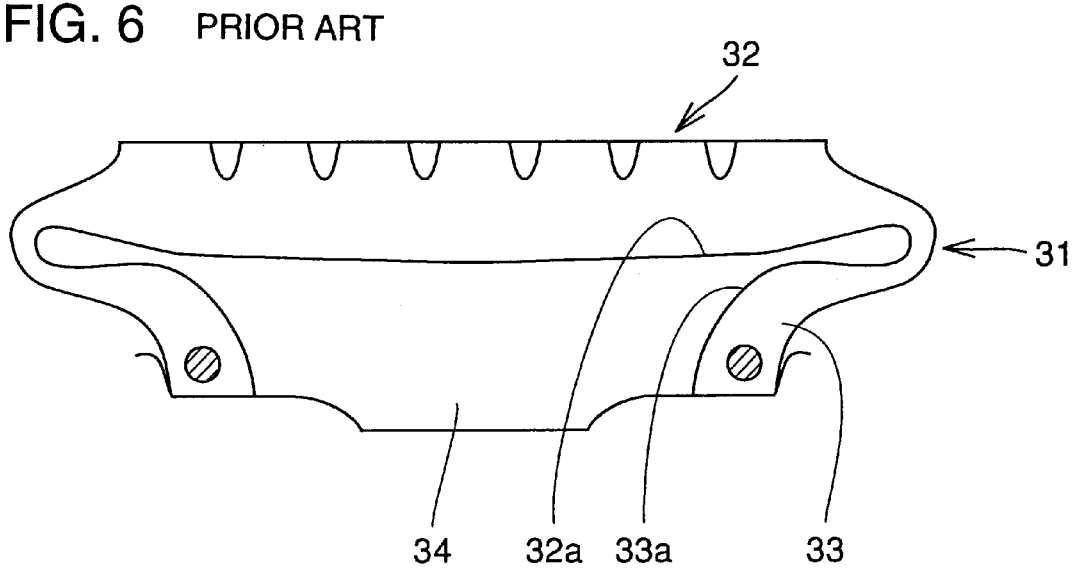
FIG. 6 is a cross section of a conventional tire when punctured.

In the run-flat situation, the pneumatic tire has its side-wall portion deformed to protrude outward, as shown in FIG. 6. In this situation, stress-strain tends to generate at the end portion of the belt layer. Therefore, by arranging a rubber layer of a prescribed thickness in this region, stress concentration can effectively be dispersed and relaxed. Thus, when the thickness t is smaller than 18%, the above-described effect is not expected. When the thickness t exceeds 50%, the effect associated with the increase in thickness is not recognized, and rather the weight of the tire is increased undesirably. More preferable range is 20% to 40%.

In the pneumatic tire in accordance with the present invention, cross sectional widths G1W, G2W and G3W, respectively representing minimum width between an inner surface of the tire and positions G1, G2 and G3 on the outer surface of the side-wall at portions ¼GL to ¾GL corresponding to the cross sectional height GL from an upper end of the bead wire 6 to a tire outer peripheral end divided equally by 4 shown in FIG. 1, satisfy prescribed relations.

More specifically, G3W/G1W is in the range of 0.85 to 0.95, and G2W/G1W is in the range of 1.0 to 1.05. By maximizing the thickness at the central portion of the side-wall and minimizing it near the shoulder portion, the amount of deflection in the run-flat situation can be suppressed and, in addition, the amount of deflection can be made uniform from the bead portion to the shoulder portion. Thus, stress concentration can effectively be reduced.

Further, in the present invention, respective ratios of the widths G1a, G2a and G3a of the second reinforcing rubber layer at respective positions G1, G2 and G3 to the cross sectional widths G1W, G2W and G3W are in the range of G1a/G1W=0.30 to 0.55, G2a/G2W=0.38 to 0.48 and G3a/G3W=0.20 to 0.30. By this arrangement, the ratio of load shared by the second reinforcing rubber layer can gradually be reduced in the direction from the bead portion to the shoulder portion, enabling effective stress relaxation in the run-flat situation.

Figure 2:
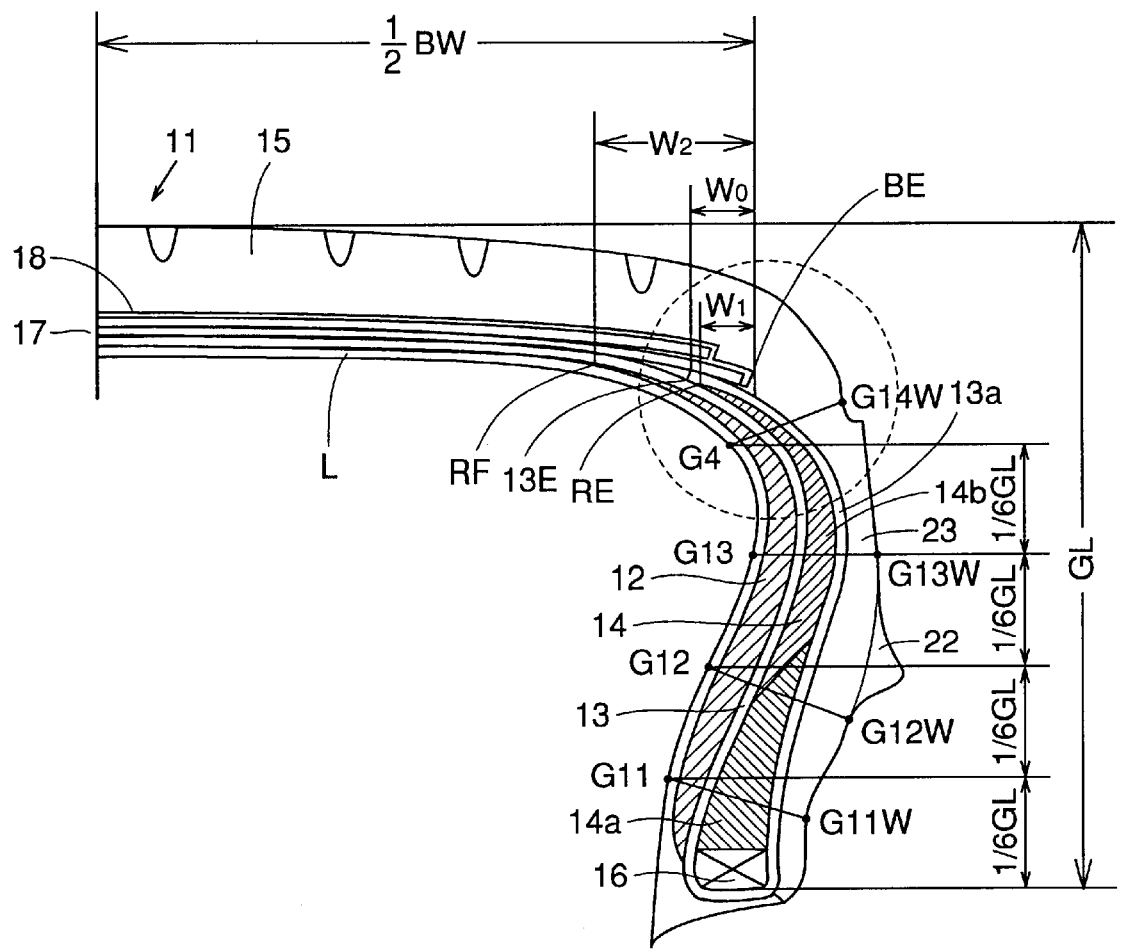
FIG. 2 shows a right half of a tire cross section in accordance with one embodiment of the present invention.

FIG. 2 shows the right half of a cross section of a pneumatic tire representing an embodiment of the present invention.

Here, the pneumatic tire 11 in accordance with the present invention has at least one carcass ply 13 with cords arranged substantially in the radial direction of the tire, folded turned up around a bead core 16 from the inside to the outside. A folded end 13E is fixed below a belt layer 17 arranged outside a crown portion of the carcass ply, to be partially overlapped with an end portion of the belt layer. Carcass ply 13 has its folded end 13E pulled to the direction of the bead portion as it is repeatedly subjected to deformation as the tire runs, and the rubber deforms near the end portion BE of the belt layer. Therefore, stress concentration tends to generate here. Therefore, by fixing the folded end 13E at a lower side of the belt layer, the effect of reducing stress concentration and improving rigidity of the side-wall portion can be attained. Here, the width of overlapping between the folded portion 13a of the carcass ply and the belt layer 17 should preferably be 5 to 20% of the width BW of the belt layer.

Next, in the present invention, a first reinforcing rubber layer 14 is arranged between carcass ply body 13 and the folded portion 13a thereof, extending from an upper end of bead core 16 to the vicinity of an end portion of the belt layer. Here, the overlapping width $W_1$ between the upper end position RE of the first reinforcing rubber layer and the end BE of the belt layer is in the range of 3% to 20% of the width BW of the belt layer. When the overlapping width $W_1$ is smaller than 3%, the upper end position RE of the first reinforcing rubber layer would be positioned near or below the end BE of the belt layer, generating an abrupt change in rigidity in this region, which tends to produce stress concentration. As a result, peeling of the rubber results near the opposing ends of the belt layer.

By contrast, when the width exceeds 20%, the volume of the rubber layer not contributing to the run-flat property increases, which hinders reduction of the tire weight. Preferably, the first reinforcing rubber layer 14 consists of two layers, including a hard rubber layer 14a extending from an upper side of the bead core to the direction of the side-wall portion with its thickness gradually reduced and having JISA hardness of 80 to 90 and more preferably 85 to 95, and a soft rubber layer 14b extending from an upper side of the hard rubber layer 14a to the vicinity of the end portion of the belt layer and having JISA hardness of 65 to 80 and preferably 65 to 70.

Hard rubber layer 14a reinforces the bead portion and enhances lateral rigidity of the tire at the time of tire puncture, while soft rubber layer 14b reinforces the tire side-wall portion, relaxes stress concentration near opposing ends of the belt layer at the shoulder portion and alleviates damages. When the first reinforcing rubber layer 14 is to be formed of one layer, a material having JISA hardness of 65 to 90, and more preferably, 65 to 85 is used. As the first reinforcing rubber layer 14 is surrounded by the carcass ply with the upper end of the folded portion of the carcass ply fixed at the lower side of the end portion of the belt layer, the effect of reinforcement can further be enhanced by the volume effect.

Next, in the pneumatic tire in accordance with the present invention, a second reinforcing rubber layer 12 is arranged on the inner side of carcass ply body 13 over a region from a portion corresponding to the tire shoulder portion to the bead portion, with its thickness gradually reduced from the central portion toward opposing ends. The second reinforcing rubber layer 12 is of a rubber composition having small oil content and superior heat resistance, and a relatively soft rubber having JISA hardness of 65 to 80 is used. At the time of tire puncture, the side-wall portion is folded protruding outward, and a bead portion and a shoulder portion of the second reinforcing rubber layer 12 inside the tire come to be in contact with each other, causing friction. Therefore, the second reinforcing rubber layer is formed by using rubber with low heat build up property, for example, rubber having the resilience of at least 50%, so that damages associated with the friction can be suppressed. As to the cross sectional shape of the second reinforcing rubber layer 12, it has the maximum width in the side-wall region, the thickness is gradually reduced toward opposing ends, and the upper end portion RF extends inward, over the end BE of the belt layer. The overlapping width $W_2$ with the belt layer is in the range of 7 to 33% of the width BW of the belt layer.

Figure 3:
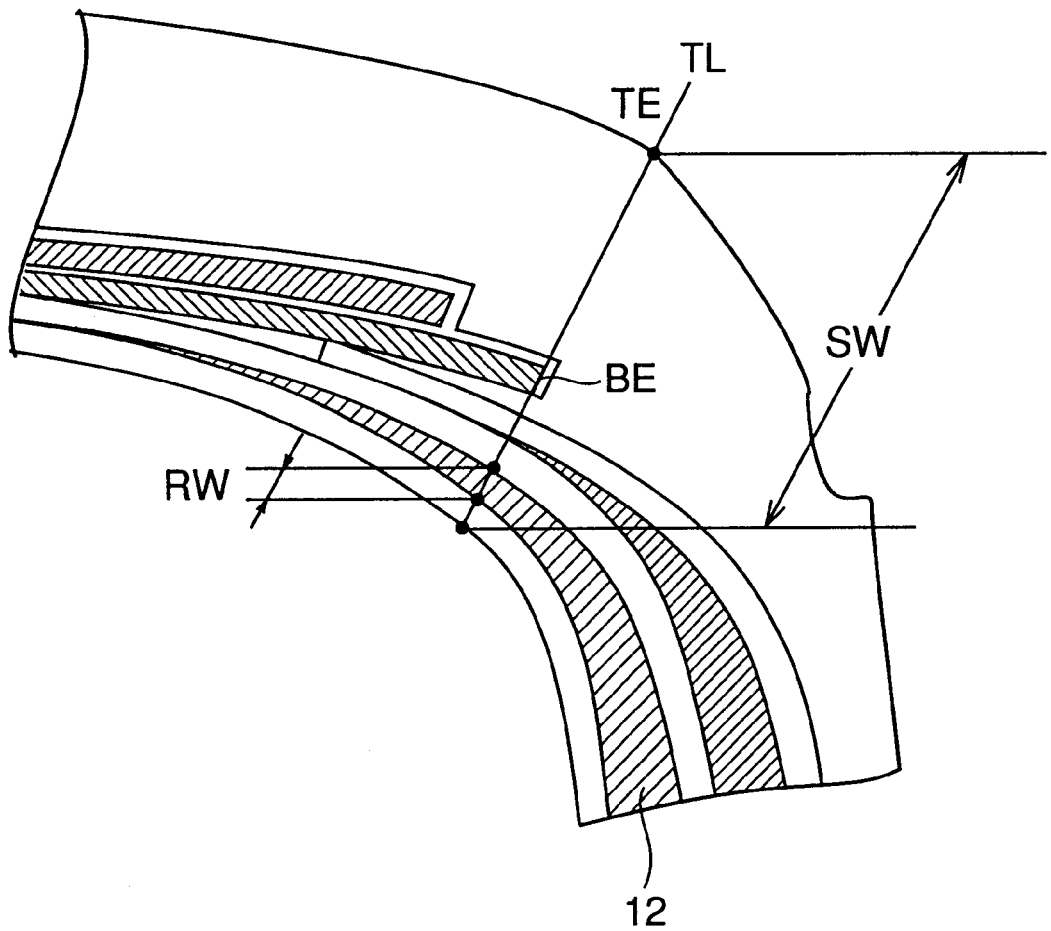
FIG. 3 is an enlarged view of a shoulder portion of the tire shown in FIG. 2.

In FIG. 3 showing, in enlargement, the shoulder portion of the pneumatic tire shown in FIG. 2, the thickness RW of the second reinforcing rubber layer 12 on the line TL connecting the end BE of the belt layer and the tread end TE is in the range of 5 to 25% of the entire thickness of the tire.

Here, the tread end TE is defined as an intersecting point of an extension of curvature arc of the tread portion and an extension of curvature arc of the shoulder portion.

In the run-flat situation, the tire deforms significantly as shown in FIG. 6. In this situation, stress-strain tends to generate at the end portion of the belt layer. Therefore, by arranging a rubber layer of a prescribed thickness in this region, stress concentration can effectively be dispersed and relaxed. Thus, when the thickness RW is smaller than 5%, the above-described effect is not expected. When the thickness RW exceeds 25%, the effect associated with the increase in thickness is not recognized, and rather the weight of the tire is increased undesirably. More preferable range is 7% to 15%.

Figure 4:
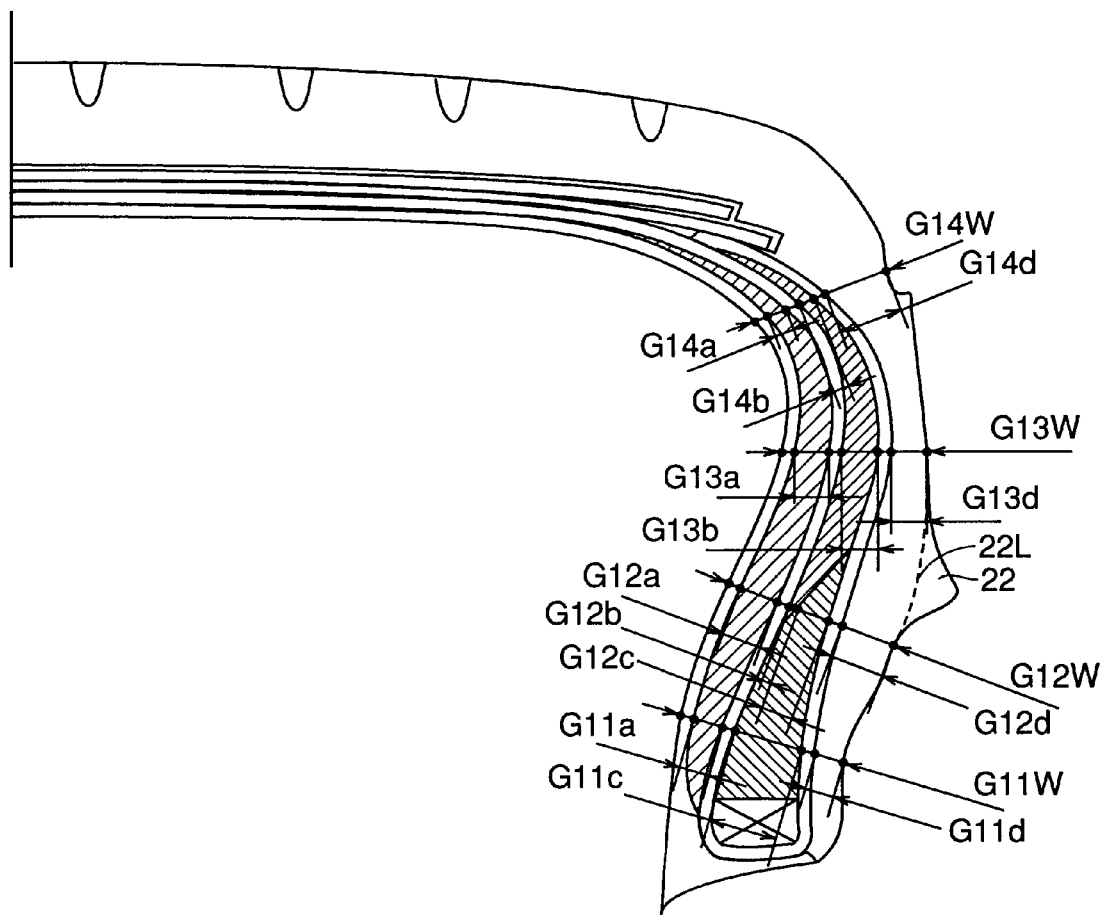
FIG. 4 represents thickness dimensions of the tire shown in FIG. 2.

Next, in the pneumatic tire in accordance with the present invention, the width Ga of the second reinforcing rubber layer, the width Gb of the soft rubber layer and the width Gc of the hard rubber layer of the first reinforcing rubber layer, and the width Gd of the side-wall 23 should desirably satisfy the following relations, on the cross sectional minimum width lines G11W, G12W, G13W and G14W, representing minimum width between the tire outer contour line and respective inner liner positions G11, G12, G13 and G14 at positions ⅙GL to ⅘GL corresponding to cross sectional height GL from a lower end of the bead wire 16 to a tire outer peripheral end divided equally by 6 in FIGS. 2 to 4. Here, the outer contour line of the tire is defined as a contour line of an outer surface of the tire from the bead portion to the side-wall 23, while the rim protector portion 22 is defined by a smooth extension 22L of the contour of the bead portion and the side-wall.

At G11W, G11a≦G11d<G11c, at G12W, G12b≦G12a≦G12c<G12d, at G13W, G13a≈G13≈G13d, and at G14W, G14a≈G14b<G14d.

Further, in the present invention, it is desired that the following relations are satisfied at respective positions G11 to G14.

Position G11

G11a is 0% to 20% with respect to the width G11W,

G11c is 50% to 67% with respect to the width G11W, and

G11d is 10% to 30% with respect to the width G11W

Position G12

G12a is 10% to 20% with respect to the width G12W,

G12b is 0% to 20% with respect to the width of G12W,

G12c is 10% to 25% with respect to the width of G12W, and

G12d is 25 to 34% with respect to the width of G12W.

Position G13

G13a is 20% to 34% with respect to the width G13W,

G13b is 20% to 35% with respect to the width G13W, and

G13d is 20% to 36% with respect to the width G13W

Position G14

G14a is 10% to 20% with respect to the width G14W,

G14b is 10% to 20% with respect to the width G14W, and

G14d is 33% to 67% with respect to the width G14W.

By such an arrangement, it becomes possible to minimize the thickness of the first reinforcing rubber layer 14, the second reinforcing rubber layer 12 and side-wall 23, and to improve running stability and durability in the run-flat situation.

Figure 5:
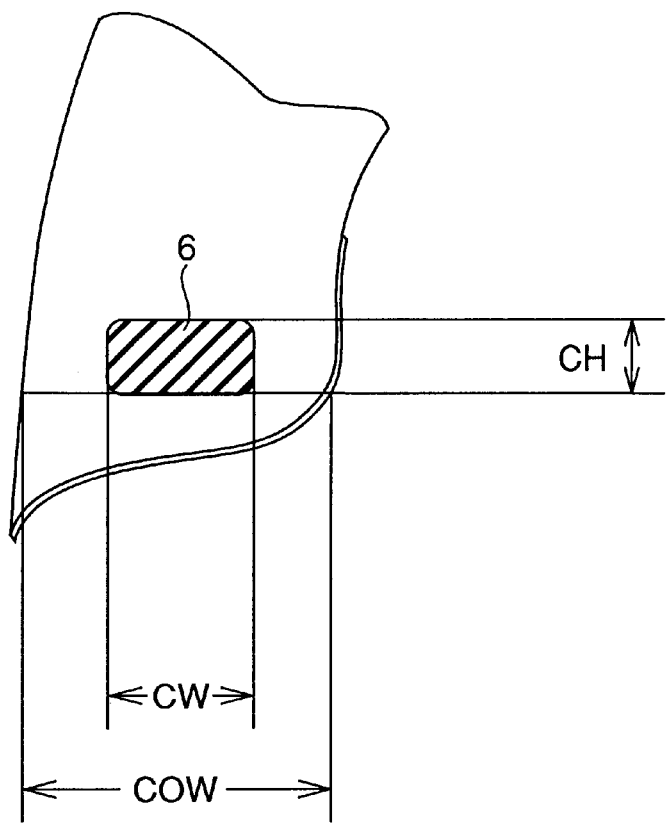
FIG. 5 is an enlarged view of a bead portion of the tire in accordance with the present invention.

In the bead core 6 of the present invention as shown in FIG. 5, the ratio CW/CH of the cross sectional height CH to the cross sectional width CW should preferably be 1.0 or higher, and preferably in the range of 1.2 to 2.0.

In the present invention, as the first and second reinforcing rubber layers are arranged, the cross sectional width COW of the bead portion is made thicker than in a common pneumatic tire. In order to reinforce such a bead portion, a bead portion of a prescribed width is necessary. On the other hand, wide cross sectional shape at the bead portion is advantageous to meet the demand of a light weight tire.

In the present invention, it is possible to arrange an inner liner L entirely over the inside of the second reinforcing rubber layers 2 and 12 shown in FIGS. 1 and 2. For the inner liner L, a rubber composition mainly consisting of butyl rubber, halogenated butyl rubber or the like may be used.

EXAMPLE 1

Comparative Example 1

In accordance with the specification shown in Table 1, tires of the tire size 195/45R15 and having the basic structure shown in FIG. 1 were manufactured as Example 1 and Comparative Example 1, where Example 1 satisfy the relations shown in Table 2, and Comparative Example 1 satisfy the relations of Table 3. Performances of the tires were evaluated in the following manner, in 4 grades of excellent (◎), good (○) fair (Δ) and failed (X).

(1) Drum durability

The tire was subjected to running under the load of 262 kg with the air pressure of 0, and the distance until a crack was observed on the outer surface of the tire was measured.

(2) Deflection amount in the run-flat situation

The tires were mounted on a vehicle, and the air pressure was reduced to 0 to realize the run-flat state. In this state, deflection amount of the tire was measured in terms of the ratio of cross sectional height to the height when the tire was filled with the normal inner pressure, and the result is given as an index using Comparative Example 1 as a reference.

(3) Steering performance

The tires were mounted on a vehicle, only one front tire was set to the run-flat state, the vehicle was driven at 60 km/h, and the feeling of steering stability was evaluated.

From the results of evaluation shown in Tables 2 and 3, it can be understood that a drum durability, deflection amount in the run-flat situation and the steering performance of Example 1 in accordance with the present invention are all improved as compared with Comparative Example 1.

TABLE 1

| | | |
|---|---|---|
| carcass | cord material | steel |
| | cord structure (diameter × number) (mm) | 0.25 × 3 |
| | cord angle (to peripheral direction) | 88° |
| | ratio of overlapping width of folded portion and belt layer to BW (%) | 10% |
| | cord strength (N) | 456 |
| belt layer | cord material | steel |
| | cord structure (diameter × number) | 0.25 × 3 |
| | cord angle (to peripheral direction) | 26 |
| | ply number | 2 |
| 1st reinforcing rubber | JIS A hardness (soft rubber layer/hard rubber layer) | 70/80 |
| | ratio of overlapping width ($w_1$) of folded portion and belt layer to BW (%) | 7% |
| 2nd reinforcing rubber | JIS A hardness | 70 |
| | ratio of overlapping width ($W_2$) of folded portion and belt layer to BW (%) | 23% |
| bead core | width (CW)/height(CH) | 1 |

TABLE 2

Example 1

| | tire thickness | | thickness of 2nd reinforcing layer | | thickness |
|---|---|---|---|---|---|
| | GnW | thickness (mm) | GnW | thickness (mm) | ratio (%) Gna/GnW |
| position G1 | G1W | 10.5 | G1a | 4.0 | 38 |
| position G2 | G2W | 11.0 | G2a | 4.5 | 41 |
| position G3 | G3W | 10.0 | G3a | 2.5 | 25 |
| end portion of belt layer | T | 15.0 | t | 3.0 | t/T 20 |
| G2W/G1W | | | | | 105% |
| G3W/G1W | | | | | 95% |
| drum durability | | | | | ◉ |
| amount of deflection in flat-run situation | | | | | 35 |
| steering stability | | | | | ◉ |

TABLE 3

Comparative Example 1

| | tire thickness | | thickness of 2nd reinforcing layer | | thickness |
|---|---|---|---|---|---|
| | GnW | thickness (mm) | GnW | thickness (mm) | ratio (%) Gna/GnW |
| position G1 | G1W | 8.0 | G1a | 1.0 | 13 |
| position G2 | G2W | 8.5 | G2a | 3.0 | 35 |
| posihon G3 | G3W | 8.0 | G3a | 4.5 | 56 |
| end portion of belt layer | T | 14.0 | t | 3.0 | t/T 21 |
| G2W/G1W | | | | | 106% |
| G3W/G1W | | | | | 100% |
| drum durability | | | | | X |

TABLE 3-continued

Comparative Example 1

| | tire thickness | | thickness of 2nd reinforcing layer | | thickness |
|---|---|---|---|---|---|
| | GnW | thickness (mm) | GnW | thickness (mm) | ratio (%) Gna/GnW |
| amount of deflection in flat-run situation | | | | | 100 |
| steering stability | | | | | Δ |

EXAMPLES 2 TO 5

Comparative Examples 2 to 4

Tires of the tire size 195/45R15 and having the basic structure of FIG. 2 were manufactured, in accordance with the specifications of Tables 4 and 5. The performances of the tires were evaluated in the following manner. The evaluation was in 4 grades of excellent (◉), good (○), fair (Δ) and failed (X).

The drum durability and the steering performance were evaluated in the similar manner as described above.

<Actual On-board Test of Rim Holding>

The tires were mounted on a vehicle, and the air pressure was reduced to 0 to realize the run-flat state. In this state, the vehicle was driven to run rotating on a circle of 7.5R at 27 km/h, and the number of rotation until the tire was folded into the rim well was measured.

TABLE 4

| tire thickness | | | thickness of structural portion | | tire thickness |
|---|---|---|---|---|---|
| position | | thickness (mm) | position | thickness (mm) | ratio (%) |
| position G1 | G1W | 17 | G1a | 1.5 | 9 |
| | | | G1c | 9.5 | 56 |
| | | | G1d | 2 | 12 |
| position G2 | G2W | 18 | G2a | 3 | 17 |
| | | | G2b | 2 | 11 |
| | | | G2c | 3.5 | 19 |
| | | | G2d | 5 | 28 |
| position G3 | G3W | 18 | G3a | 4 | 22 |
| | | | G3b | 4.5 | 25 |
| | | | G3d | 5.5 | 31 |
| position G4 | G4W | 17 | G4a | 3 | 18 |
| | | | G4b | 3 | 18 |
| | | | G4d | 7 | 41 |

TABLE 5

| | | Example 2 | Example 3 | Example 4 | Example 5 | Comparative Example 2 | Comparative Example 3 | Comparative Example 4 |
|---|---|---|---|---|---|---|---|---|
| carcass | cord material | steel | steel | steel | steel | polyester | steel | steel |
| | cord structure (diameter ×) | 0.25 × 3 | 0.25 × 3 | 0.25 × 3 | 0.25 × 3 | 1670dtex/2 | 0.25 × 3 | 0.25 × 3 |
| | cord angle (to peripheral direction) | 88° | 88° | 88° | 88° | 88° | 88° | 88° |
| | ratio (%) of overlapping width ($w_0$) of folded portion and belt layer to BW | 10% | 10% | 15% | 15% | 10% | −5% | −10% |
| | cord strength (N) | 456 | 456 | 456 | 456 | 230 | 456 | 456 |

TABLE 5-continued

|  |  | Example 2 | Example 3 | Example 4 | Example 5 | Comparative Example 2 | Comparative Example 3 | Comparative Example 4 |
|---|---|---|---|---|---|---|---|---|
| belt layer | cord material | steel | steel | steel | steel | steel | steel | steel |
|  | cord structure (diameter × number) | 0.25 × 3 | 0.25 × 3 | 0.25 × 3 | 0.25 × 3 | 0.25 × 3 | 0.25 × 3 | 0.25 × 3 |
|  | cord angle (to peripheral direction) | 26 | 26 | 26 | 26 | 26 | 26 | 26 |
|  | ply number | 2 | 2 | 2 | 2 | 2 | 2 | 2 |
| 1st reinforcing rubber | JIS A hardness (soft rubber layer/hard rubber layer) | 70/80 | 70/80 | 70/80 | 70/80 | 70/80 | 70/80 | 70/80 |
|  | ratio (%) of overlapping width ($w_1$) of folded portion and belt layer to BW | 7% | 7% | 10% | 10% | 7% | 0% | −5% |
| 2nd reinforcing rubber | JIS A hardness | 70 | 70 | 70 | 70 | 70 | 70 | 70 |
|  | ratio (%) of overlapping width ($w_2$) of folded portion and belt layer to BW | 13% | 13% | 20% | 20% | 13% | 5% | 0% |
|  | thickness RW/SW (%) | 7% | 7% | 7% | 7% | 7% | 2% | 0% |
| bead core | width (CW)/height (CH) | 1 | 2 | 1 | 2 | 2 | 0.7 | 0.5 |
| band | cord material | 940dtex/2 | 940dtex/2 | 940dtex/2 | 940dtex/2 | 940dtex/2 | 940dtex/2 | 940dtex/2 |
|  | cord angle (to peripheral direction) | 0 | 0 | 0 | 0 | 0 | 0 | 0 |
| performance | drum durability | ○ | ⊚ | ⊚ | ⊚ | Δ | X | X |
|  | actual on-board test of rim holding | ○ | ⊚ | ○ | ⊚ | Δ | Δ | X |
|  | steering stability | ○ | ⊚ | ○ | ⊚ | Δ | Δ | X |

From the result of evaluation shown in Table 5, it can be understood that the drum durability, rim holding performance and steering performance of the examples in accordance with the present invention are all improved as compared with the Comparative Examples.

As described above, in the present invention, the strain experienced at the side-wall portion when the inner pressure lowers at the time of tire puncture, for example, can be dispersed sufficiently, while the rigidity of the side-wall portion is enhanced. Therefore, the amount of deflection in the run-flat situation can be reduced to 6 to 8% in terms of the ratio of cross sectional height (which was conventionally about 20%), which means that the run-flat running distance can be ensured while maintaining steering stability. Further, as the hardness and the thickness of the first and second reinforcing rubber layers arranged at the side-wall portion are in prescribed ranges, the weight of the tire can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is

1. A pneumatic tire, comprising:
at least one carcass ply having steel cords arranged substantially in a radial direction of the tire, folded turned up aroaund a bead core;
a belt layer arranged on an outer side of a crown portion of said at least one carcass ply to have an overlapping portion with the folded portion of said at least one carcass ply;
a first reinforcing rubber layer arranged between a body portion of said at least one carcass ply and said folded portion thereof;
a second reinforcing rubber layer arranged inside the body portion of said at least one carcass ply, over a region from a tire shoulder portion to a bead portion, with its thickness gradually reduced from a central portion to opposing end portions; wherein
overlapping width $W_2$ from an upper end position RF of said second rubber reinforcing layer to an end BE of said belt layer is 7% to 33% of the width BW of the belt layer; and
cross sectional widths G1W, G2W, and G3W representing minimum widths between an inner surface of the tire and respective side-wall outer surface positions G1, G2 and G3 at portions of ¼GL, 2/4GL, and ¾GL corresponding to cross sectional height GL from an upper end of the bead core to a tire outer peripheral end divided equally by 4 satisfy the following relations:

$$G3W/G1W = 0.85 \text{ to } 0.95, \text{ and}$$

$$G2W/G1W = 1.0 \text{ to } 1.05.$$

2. The pneumatic tire according to claim 1, wherein said respective cross sectional widths G1W, G2W and G3W and widths G1a, G2a, and G3a of the second rubber reinforcing layer at the respective cross sectional widths satisfy the following relations:

$$G1a/G1W = 0.30 \text{ to } 0.55$$

$$G2a/G2W = 0.38 \text{ to } 0.48, \text{ and}$$

$$G3a/G3W = 0.20 \text{ to } 0.30.$$

3. The pneumatic tire according to claim 1, wherein the first reinforcing rubber layer consists of a hard rubber layer extending in a direction from an upper side of the bead core to the side-wall portion, having JISA hardness of 80 to 95, and a soft rubber layer extending from an upper side of said hard rubber layer to a vicinity of an end portion of the belt layer, having JISA hardness of 65 to 80.

4. The pneumatic tire according to claim 1, wherein overlapping width $W_1$ of the upper end position RE of the first reinforcing rubber layer and the end BE of the belt layer is in the range of 3% to 20% of a width BW of the belt layer.

5. The pneumatic tire according to claim 1, wherein JISA hardness of the second reinforcing rubber layer is in the range of 65 to 80.

* * * * *